United States Patent [19]

Hodge

[11] Patent Number: 4,749,040

[45] Date of Patent: * Jun. 7, 1988

[54] METHOD OF FRACTURING A SUBTERRANEAN FORMATION USING DELAYED CROSSLINKER COMPOSITIONS CONTAINING ORGANIC TITANIUM COMPLEXES

[75] Inventor: Richard M. Hodge, Sand Springs, Okla.

[73] Assignee: Dowell Schlumberger Incorporated, Tulsa, Okla.

[*] Notice: The portion of the term of this patent subsequent to Apr. 14, 2004 has been disclaimed.

[21] Appl. No.: 17,134

[22] Filed: Feb. 20, 1987

Related U.S. Application Data

[63] Continuation-in-part of Ser. No. 831,230, Feb. 19, 1986, Pat. No. 4,657,080.

[51] Int. Cl.$^4$ .............................................. E21B 43/26
[52] U.S. Cl. .................................. 166/308; 252/8.551
[58] Field of Search ...................... 166/271, 307, 308; 252/8.551, 8.553

[56] References Cited

U.S. PATENT DOCUMENTS

| | | | |
|---|---|---|---|
| 3,980,136 | 9/1976 | Plummer et al. | 166/308 X |
| 4,460,751 | 7/1984 | Hanlon et al. | 166/295 X |
| 4,462,917 | 7/1984 | Conway | 166/308 X |
| 4,464,270 | 8/1984 | Hollenbeak et al. | 166/308 X |
| 4,470,915 | 9/1984 | Conway | 166/308 X |
| 4,477,360 | 10/1984 | Almond | 166/308 X |
| 4,488,975 | 12/1984 | Almond | 166/308 X |
| 4,553,601 | 11/1985 | Almond et al. | 166/308 |
| 4,579,670 | 4/1986 | Payne | 166/308 X |
| 4,609,479 | 9/1986 | Smeltz | 252/8.551 |

*Primary Examiner*—George A. Suchfield
*Attorney, Agent, or Firm*—S. A. Littlefield

[57] ABSTRACT

A crosslinker composition that can produce delayed crosslinking of an aqueous solution of a crosslinkable organic polymer. The composition comprises an organic titanium complex. The composition further contains an organic alpha-hydroxymonocarboxylic acid, preferably hydroxyacetic acid. The pH of the composition is preferably less than 5. The pH of the composition is further preferably such that when sufficient amount of composition is added to an aqueous polymer solution to result in delayed crosslinking of the polymer, the composition produces a pH in the resulting gel solution, preferably of between about 3 and about 4.5. Gel solutions produced using the composition are particularly useful in fracturing subterranean formations, and in particular in fracturing subterranean formations penetrated by an oil well in which fracturing process carbon dioxide and a proppant are added to the fracturing fluid. Aqueous organic polymer solutions which can be crosslinked by the composition, include guar, hydroxypropyl guar, carboxymethylhydroxypropyl guar, and carboxymethylhydroxyethyl cellulose.

3 Claims, No Drawings

METHOD OF FRACTURING A SUBTERRANEAN FORMATION USING DELAYED CROSSLINKER COMPOSITIONS CONTAINING ORGANIC TITANIUM COMPLEXES

CROSS-REFERENCE TO RELATED APPLICATION

This application is a continuation-in-part of application Ser. No. 831,230 filed Feb. 19, 1986, now U.S. Pat. No. 4,657,080.

FIELD OF THE INVENTION

This invention relates to a composition useful for providing delayed crosslinking of an aqueous solution of an organic polymer to produce a gel, the amount of delay being adjustable by adjusting the concentration of components present in the composition. The invention also relates to a method of using such compositions as fracture fluids in fracturing subterranean formations.

DESCRIPTION OF RELATED ART

A known technique in fracturing a subterranean formation, particularly an oil-bearing formation, involves pumping a fluid down the wall at a sufficient flow rate and pressure to fracture the subterranean formation. In order to prevent the resulting fracture from closing upon release of fluid pressure, typically a hard particulate material known as a proppant, is dispersed in the fracturing fluid to be carried into the resulting fracture and deposited there. It is desirable that the fracturing fluid have a fairly high viscosity, and preferably a gel-like consistency, at least when it is within the fracture so that the proppant can be carried as far as possible into the resulting fracture. Previously, a relatively high viscosity fracturing fluid, or gel, would be prepared on the surface and the proppant dispersed therein, such gelled fluid then being pumped down the well. Such a procedure requires high pumping pressures due to the high viscosity of the gelled fluid as it is pumped down the wellbore, and results in high friction losses within the bore and pipes. In fact, the viscosity of the gel prepared on the surface might often be lower than the viscosity desired within the fracture due to viscosity limitations imposed upon the gel by the pumping abilities of typical pumps used in such an operation. Further, fully crosslinked fluids may suffer irreparable viscosity degradation from the high shear environment experienced in the wellbore. Thus, it would be desirable that the fracturing fluid exhibit a relatively low viscosity as it is being pumped down the wellbore, and in addition exhibit a relatively high viscosity when it is within the fracture itself.

In a particular fracturing method known as "foam fracturing", carbon dioxide is pumped along with the fracturing fluid into the wellbore. Foam fracturing was pioneered by Blauer et al. in U.S. Pat. No. 3,937,283, and others have followed. See for example, U.S. Pat. No. 4,480,696 and the patents cited therein. U.S. Pat. No. 4,488,975 further discloses in such a fracturing method, the use of aqueous organic polymer solutions (such as carboxyalkylhydroxyalkyl guar solutions) and organic metal complexes (such as Zr and Al complexes) to crosslink such polymers to produce a gel. In the method of the preceding patent, crosslinking occurs only at a low pH, and the proper addition rate of carbon dioxide is relied upon to produce an appropriate pH range for such crosslinking. In the practice of the foregoing method though, carbon dioxide equipment failure could result, with consequent drastic changes in the pH of the polymer solution and therefore drastic changes in the ultimate rheology of the fracturing fluid. One method of overcoming this problem, which has been used in the past, was to add a buffer to the fracturing fluid (which would typically be close to pH 7) before addition of the crosslinker composition. Such an approach though, in addition to being time consuming, may cause corrosion of the tanks commonly used to store fluid on location. Corrosion of the tanks can cause iron contamination of the fracturing fluid, which results in premature viscosity reduction of it. It would also be desirable then, to have a crosslinker composition which is itself acidic (with a pH of less than about 5, and typically less than about 4) and is stable under such acidic conditions, such that when a sufficient quantity of it is added to the polymer solution to crosslink the polymer, the pH of the polymer solution can be simultaneously reduced from about 7 (the typical pH before $CO_2$ is added, or when there is $CO_2$ equipment failure) to less than about 5, and preferably less than 4.

Fracturing fluids which have been used in the past include aqueous solutions of polymers such as guar, hydroxypropyl guar (HPG), carboxymethylhydroxyethyl cellulose (CMHEC), and carboxymethylhydroxypropyl guar (CMHPG), and the like or a combination of such polymers. Use of one or more of the foregoing aqueous polymer solutions or other similar aqueous polymer solutions is disclosed in U.S. Pat. Nos. 4,470,915, 4,460,751, 4,369,124, 4,462,917 and 4,018,286. The foregoing patents also disclose methods whereby various organic metal complexes are used to crosslink the polymers. For example, U.S. Pat. No. 4,369,124 discloses crosslinking many of the foregoing aqueous polymer solutions by utilizing certain specified organic titanium monomers or polymers. Such titanium complexes are provided in solid form and the rate of reaction or crosslinking is controlled by the rate of dissolution of the titanium complex. U.S. Pat No. 4,470,915 on the other hand, attempts to delay crosslinking of polymers by organotitanate chelates such as titanium ammonium lactate or titanium triethanolamine, by using various polyhydroxy alcohols as a crosslinking delaying agent. The patent states that the pH of the aqueous gelling agent is adjusted to between about 5 and about 10.5 ensure that the crosslinking reaction can take place within the desired period of time.

U.S. Pat. No. 4,018,286 crosslinks various polymers, including polysaccharides and substituted celluloses, by using various metal ions including $Ti^{+4}$, $Zn^{+2}$, complexed with a "retarding ion". The "retarding ion" can be acetate, nitrilotriacetate, tartrate, citrate, tripolyphosphate, metaphosphate, gluconate, or phosphate anion. The resulting gels are indicated as useful for plugging underground formations, and must have a pH range of about 3 to about 7, and in fact are broken by changing the pH below or above the foregoing limits. U.S. Pat. No. 4,470,915 on the other hand, discloses forming gels from aqueous polymer solutions maintained at a pH of about 5 to 10.5, wherein the polymer is selected from solvatable polysaccharides such as guar, HPG, and the sodium salt of CMHPG. Organotitanate chelates such as titanium triethanolamine and titanium acetylacetonate, are used in combination with various "polyhydroxycarboxylic acids" (i.e., acids having a plurality of carboxyl functions and at least one hydroxy function), as an agent to retard crosslinking of the polymer. U.S. Pat. No. 4,460,751 utilizes a crosslinker composition to crosslink polymers including cellulose ethers such as carboxymethyl cellulose (CMC) and CMHEC, which composition includes water, $Zr^{+4}$, an alpha-hydroxycarboxylic acid, and an amine such as triethanolamine. The patent indicates that the amine and hydroxy acid delay the crosslinking action. The patent also indicates that although the crosslinker composition can be used over a wide pH range, the composition itself should have a pH of between about 5 to about 8.

Thus, it would appear that only those crosslinker compositions disclosed in U.S. Pat. No. 4,018,286 and U.S. Pat. No. 4,369,124 could possibly provide delayed crosslinking and be potentially useful in a low pH fracturing fluids (for example, around pH 4 for fluids containing $CO_2$). However, there are problems associated with such compositions which limit their use in commercial practice: U.S. Pat. No. 4,369,124 relies upon "controlled dissolution" of a solid organic titanium complex and the gels from U.S. Pat. No. 4,018,286 break at a pH of below 3. In any event, none of the crosslinker compositions disclosed in any of the foregoing patents can be maintained at a low pH so as to avoid the problems associated with carbon dioxide loss discussed above and use hydroxyacetic acid to provide a selected delay in the crosslinking of aqueous solutions of the organic polymers discussed, by organic titanium complexes.

SUMMARY OF THE INVENTION

The present invention provides a novel composition that can produce delayed crosslinking of an aqueous solution of a crosslinkable organic polymer, which solution comprises an organic titanium complex and an organic alphahydroxymonocarboxylic acid. Preferably the alpha-hydroxymonocarboxylic acid is hydroxyacetic acid, and the titanium complex is selected from the group consisting of triethanolamine titanate, titanium ammonium lactate, and titanium acetylacetonate. The polymers which may be utilized with the composition as described, include guar, HPG, CMHPG, and CMHEC. The composition preferably has present the following weight percentages: about 1% to about 10% titanium from the titanium complex; about 2% to about 37% hydroxyacetic acid; about 0% to about 64% acetic acid; and a sufficient amount of solvent to make up the balance (typically isopropanol and water in a weight percentage of about 7% to about 54%). All of the foregoing weight percentages are based on the total weight of the composition (throughout this application, where a weight percentage of a substance in any composition is given, such is based on the total weight of the composition unless otherwise stated). A sufficient amount of the composition is preferably combined with a polymer solution having sufficient polymer present, such at the resulting mixture of the polymer solution and the composition (often referred to herein as the "gel solution") has by weight percentage (based upon the total weight of the mixture), between 0.24% to 0.96% polymer, 0.0017% to 0.023% titanium from the organic titanium complex, and 0.008% to 0.4% alpha-hydromonocarboxylic acid (preferably hydroxyacetic acid), and 0% to 4% acetic acid.

The composition has particular application in a method of fracturing subterranean formations penetrated by a well, with or without carbon dioxide being added to the fracturing fluid. In such case, the composition contains sufficient acid to produce a pH in the mixture of fracturing fluid and composition, preferably between 3 and about 5 when the pH of the polymer solution is substantially 7. That is, even if the pH of the polymer solution prior to addition of the composition, was less than 7 due to prior addition of carbon dioxide, if the pH of the polymer solution should suddenly increase to about 7 due to carbon dioxide failure, the composition is sufficiently acidic such that the pH would still be maintained low, preferably about 3 to about 5, and more preferably about 3 to 4. Other conventional fracturing fluid additives can, of course, be added to compositions of the present invention, provided they are not incompatible in the formulated fluid.

DETAILED DESCRIPTION OF EMBODIMENTS OF THE INVENTION

In order to illustrate crosslinking of various aqueous organic polymer solutions and the variation in delay of crosslinking which may be obtained by varying concentrations of constituents in crosslinker compositions of the present invention, a number of vortex closure tests were performed as illustrated in Example 1 below. Such vortex closure tests provide a means for obtaining a reasonably good estimate of the time required to complete crosslinking of the polymer by an organic metal complex. Complete closure of the vortex indicates a substantial degree of crosslinking.

Example 1

The organic polymer solution used (often referred to as the "fracturing fluid") contained 0.48 percent by weight (hereinafter often referred to as "wt.%") HPG in water. Triethanolamine titanate in a propanol solution was mixed with acetic acid in a mole ratio of acetic acid to organic titanium complex, of 19/2. A sufficient amount of hydroxyacetic acid was then added to this latter solution to produce crosslinker compositions of the present invention. The amount of hydroxyacetic acid present in the crosslinker compositions used in the four trials reproduced in Table I below varied, but was sufficient to produce the desired hydroxyacetic acid concentration specified in each trial in Table I upon addition of sufficient crosslinker composition to the fluid to obtain a titanium concentration of 0.0024M (0.012 wt.%) in the resulting mixture (often referred to as the "gel solution"). In each of the trials also, this procedure produced a concentration of acetic acid of 0.14 weight %, and a pH of approximately 4. The crosslinker compositions were then combined with the aqueous polymer solutions as follows:

(1) 250 mL of the polymer solution was placed in a 500 mL WARING blender jar. The solution was mixed at low speed to form the maximum vortex with a minimum of air entrainment.

(2) Sufficient crosslinker composition (again including sufficient hydroxyacetic acid in each case to produce the required concentration in the gel solutions) was then added to the polymer solution to obtain a titanium concentration of 0.012 wt.% of the solution. The time required for the vortex to completely close at room temperature was then recorded. In trials 5 to 17 of Table I below, the amount of crosslinker composition added to the polymer solution was reduced such that the titanium concentration in the final mixture was 0.0012M (0.006 wt.% of the final mixture).

TABLE I

| Trial | Polymer .48% by wt. of gel solution | wt. % Ti | % by wt. of gel solution | | Vortex Closure Time (min) |
|---|---|---|---|---|---|
| | | | Hydroxyacetic Acid | Acetic Acid | |
| 1 | HPG | .012 | 0.0 | 0.14 | .017 |
| 2 | HPG | .012 | 0.017 | 0.14 | 0.1 |
| 3 | HPG | .012 | 0.034 | 0.14 | 1.63 |
| 4 | HPG | .012 | 0.042 | 0.14 | >60[1] |
| 5 | GUAR | .006 | 0.0 | 0.07 | .017 |
| 6 | GUAR | .006 | 0.021 | 0.07 | .52 |
| 7 | GUAR | .006 | 0.025 | 0.07 | 1.04 |
| 8 | GUAR | .006 | 0.042 | 0.07 | >30 |
| 9 | CMHPG* | .006 | 0.0 | 0.07 | .017 |
| 10 | CMHPG* | .006 | 0.042 | 0.07 | .08 |
| 11 | CMHPG* | .006 | 0.057 | 0.07 | .12 |
| 12 | CMHPG* | .006 | 0.11 | 0.07 | 3.08 |
| 13 | CMHPG* | .006 | 0.18 | 0.07 | >30 |
| 14 | CMHEC* | .006 | 0.0 | 0.07 | .017 |
| 15 | CMHEC* | .006 | 0.057 | 0.07 | .12 |
| 16 | CMHEC* | .006 | 0.11 | 0.07 | 2.45 |
| 17 | CMHEC* | .006 | 0.18 | 0.07 | 15.5 |

*pH adjusted to 7 prior to use, due to high residual caustic content in manufacture of the polmyer.

It will be seen from the results of Table I then, that the delay in crosslinking time in gel solutions of the types prepared in Example 1 can be adjusted by the concentration of hydroxyacetic acid in the gel solution, and hence can simply be controlled by varying the amount of hydroxyacetic acid present in the crosslinker composition prior to addition to the polymer solution. It will also be apreciated, particularly in view of Table I above, that the amount of organic metal complex utilized to produce sufficient crosslinking (that is produce a gel which does not have too low or too high a viscosity) will depend upon the particular organic polymer utilized. Furthermore, as will be observed from Trials 5-17, even when the titanium concentration from the organo titaniumn complex is constant, the amount of hydroxyacetic acid required for a given delay in crosslinking will vary depending upon the polymer with which the composition is used.

It has also been discovered that the length of the crosslinking delay resulting from use of a crosslinker compositions of the present invention to prepare the gel solution, is affected by the pH of the gel solution. The results of Example 2 below illustrate the effect of pH.

Example 2

The same procedure was utilized as in trials 1-4 of Table I (HPG polymer), except that prior to addition of the crosslinker composition to the polymer solution, HCl was added to obtain a solution with pH less than 4, while NaOH was added to obtain solution with a pH greater than 4. The titanium concentration in the gel solution was 0.0025M (substantially 0.012 wt. % of the composition), while the hydroxyacetic acid concentration in each trial was 0.0044M (substantially 0.034 wt. % of the gel solution). The results are summarized in Table II below.

TABLE II

| pH of Gel Mixture | Vortex Closure Time (min) |
|---|---|
| 3.32 | >20 |
| 4.00 | 3.17 |
| 5.50 | 0.05 |

It will be seen from the results of Table II above then, that as pH is lowered the crosslinking delay time increases. When the gel solution is to be used in fracturing a typical oil well, generally one would desire a vortex closure time of somewhere between approximately 30 seconds to 25 minutes. It will be seen from Table II above, then, that it would be desirable in many cases to maintain the pH of the gel mixture at less that about 5, and preferably about 3 to about 4, when the gel solution is to be used for such purpose.

To illustrate the performance of crosslinker compositions of the present invention, at different temperatures, the trials of Example 3 below were conducted.

Example 3

Three crosslinker compositions were prepared as follows:

(A) Mix 0.62 millimoles (hereinafter often referred to as "mmoles") of triethanolamine titanate, 5.92 mmoles of acetic acid, 1.90 mmoles of hydroxyacetic acid, and 3.96 mmoles of water.

(B) Mix 0.31 mmoles of triethanolamine titanate, 2.96 mmoles of acetic acid, 0.95 mmoles of hydroxyacetic acid, 1.98 mmoles of water.

(C) Mix 0.31 mmoles triethanolamine titanate, 2.96 mmoles of acetic acid, 3.80 mmoles of hydroxyacetic acid, and 7.92 mmoles of water.

A gel solution was prepared by using selected polymer solutions and one of the preceding crosslinker compositions using the following procedure:

(1) Add 250 mL of the selected aqueous polymer solution to a 500 mL WARING blender jar.
(2) Adjust the pH to 6-8 if needed with aqueous NaOH or HCl.
(3) Adjust the speed of the blender to produce the maximum vortex size with minimum air entrainment.
(4) Add the crosslinker composition
(5) Mix for 10 seconds and transfer 50 mL of fluid to a FANN 50C viscometer rotor.
(6) Maintain a constant shear rate of 85 sec$^{-1}$ between shear rate ramps.
(7) Perform shear rate ramps of 85, 170, 255, 340, 425, and 510 sec$^{-1}$ at 75° F. three minutes after the addition of the crosslinker, and then again immediately upon reaching the test temperature (which required approximately a further 20 minutes).

The results of the viscosity measurements at 75° F. (room temperature) and 200° F. are summarized in Table III below.

TABLE III

| Cross-linker Com-position | wt. % of gel solution | | | | Viscosity (cp) @ 170 sec$^{-1}$ | |
|---|---|---|---|---|---|---|
| | Polymer | Ti | Hydroxy-acetic Acid | Acetic Acid | 75° F. | 200° F. |
| A | .48% HPG | 0.012 | 0.057 | 0.14 | 69 | 177 |
| B | .48% GUAR | 0.006 | 0.034 | 0.07 | 76 | 130 |
| C | .48% CMHPG | 0.006 | 0.11 | 0.07 | 135 | 343 |
| C | .48% CMHEC | 0.006 | 0.11 | 0.07 | 192 | 141 |

It will be apparent from the results form Table III, that gels produced using the crosslinker composition of the present invention, exhibit good viscosities even at higher temparatures. It was also noted during this series of experiments that the rate of crosslinking in each case appeared to increase as the temperature increased. With regard to the trial utilizing CMHEC, crosslinking of CMHEC with concentrations of titanium, hydroxyacetic acid, and acetic acid, similar to those in that trial of Example 3, would be rapid, requiring only in the vicinity of less than ten seconds. This is illustrated by the results of Trial 16 in Table I. Thus, since the room temperature viscosity measurements in Table III were taken three minutes after addition of the crosslinker composition, crosslinking in the CMHEC gel solution would have already been completed considerably earlier. Therefore, the lower viscosity of the CMHEC gel at a higher temperature in Table III, likely merely indicates thinning of the gel with increasing temperature, as one would normally expect.

To illustrate the usefulness of other organic titanium complexes in the crosslinker compositions of the present invention, crosslinker compositions were prepared utilizing various organic titanium complex solutions, acetic acid, and 66 wt.% hydroxyacetic acid solution, in a ratio by volume of 2/2/1. The complexes utilized including alcohol solutions of titanium ammonium lactate sold under the trademark "TYZOR LA", and of titanium acetylacetonate sold under the trademark "TYZOR AA" (all of the foregoing being trademarks of E. I. duPont de Nemours and Company, Inc.). The pH of the foregoing crosslinker compositions are listed below in Table IV.

TABLE IV

| Organic Titanium Complex Used | % by weight of crosslinker composition | | | |
|---|---|---|---|---|
| | Metal | Hydroxyacetic Acid | Acetic Acid | pH |
| TYZOR LA | 3.4 | 14.6 | 36.0 | 2.79 |
| TYZOR AA | 3.7 | 15.8 | 39.3 | 0.34 |

Using the method described in connection with Table I, vortex closure times were then measured at room temperature for gel solutions prepared with the above various crosslinker compositions and an aqueous polymer solution of 0.48 wt. % CMHPG. In each case two gallons of the crosslinker composition were mixed with sufficient polymer solution to produce 1,000 gallons of gel mixture. Thus, in each case the resulting hydroxyacetic acid concentration is 0.03 wt. % of the gel solution, and the acetic acid concentration 0.08 wt. % of the gel solution. The titanium concentrations resulting in the gel solutions from the crosslinker compositions, as well as the pH of the gel solutions and the vortex closure times utilizing the above 2/2/1 crosslinker compositions, are summarized in Table V below.

TABLE V

| 2/2/1 Crosslinker Composition Containing | Titanium Concentration (wt. % of Mixture) | pH of gel Solution | Vortex Closure Times (min:sec) |
|---|---|---|---|
| TYZOR LA | .008 | 3.80 | >25:00 |
| TYZOR AA | .008 | 3.61 | 00:20 |

As illustrated by Table V above, then, it is apparent that other organic titanium complexes can be utilized in conjunction with the hydroxyacetic acid, to produce a delayed crosslinker composition. In addition, it is important to note that all of the crosslinker compositions of Table IV, other than that containing TYZOR GBA were observed over a 24-hour period and appeared stable. The crosslinker compositions containing titanium triethanolamine used in all of the Examples above, were also found to be stable for at least one week, (which compositions had a pH of between 3 and 4).

Example 4

In order to evaluate the performance of the crosslinking compositions of the present invention, in the absence of carbon dioxide, a field trial fracturing treatment was performed. The treatment consisted of 80,808 gallons of crosslinked fluid and 345,000 pounds of 20/40 mesh proppant. The fluid contained hydroxypropyl guar at a concentration of 37 pounds per 1000 gallons (0.44% by weight) and a crosslinker solution comprising 75 gallons of 80% titanium triethylamine and 20% isopropyl alcohol, 78 gallons of a 74% acetic acid solution in 14% isopropyl alcohol and 12% water and 5 gallons of a 67% hydroxyacetic acid solution in water. The resulting crosslinker composition in terms of percent by weight was 3.98% Ti, 38.6% acetic acid, 2.66% hydroxyacetic acid, and the balance (54.76%) as solvent. The treatment of the well was successfully performed.

It will be seen from the above Examples and trials, that useful crosslinker delay compositions of the present invention can be prepared which utilize organic titanium complexes, a hydroxycarboxylic acid such as hydroxyacetic acid, and which are stable at a low pH. Further, the pH of the compositions are sufficiently low so that when added to a neutral aqueous polymer solution in sufficient amount to produce sufficient crosslinking of the polymer, the pH of the resulting gel solution will be less than about 5, and preferably between about 3 and 4. It will also be seen from the above that the amount of organic titanium complex, and other constituents, present, can be varied. In particular, variations in pH of the crosslinker composition can affect the pH of a typically neutral polymer solution, and thereby in turn affect the delay in the crosslinking of the polymer by the organic metal complex. In addition, changes in temperature will affect the crosslinking delay, and more importantly changes in the concentration of the hydroxyacetic acid present in the crosslinker composition and therefore in the gel solution, so also affect such delay.

Typically, to use the compositions of the present invention to fracture a subterranean formation penetrated by a well in the manner earlier described, either with or without the use of carbon dioxide, one should bear in mind factors including the depth of the well, downhole temperature, rate of pumping of the gel mixture, and the type of aqueous polymer solution being used, in order to ascertain the concentrations of the desired organic titanium crosslinking agent, hydroxyacetic acid, and acetic acid which should be present in the gel mixture, and hence should be present in the crosslinker composition to be used and to ascertain the amount of that crosslinker composition to be added to the polymer solution. Depending upon the particular organic titanium complex, and the particular polymer, and bearing in mind that typically a 30 second to 25 minute delay would be desirable in most wells under most circumstances, the following ranges of constituents will generally be present in the gel mixture (all numbers being by weight % of the gel solution):

| Polymer | 0.24–0.96 |
|---|---|
| Titanium | 0.0017–0.023 |
| Acetic Acid | 0–0.4 |
| Hydroxyacetic Acid | 0.008–0.4 |

For most crosslinker compositions, the above ranges will translate into the following concentrations in the crosslinker compositions (all figures being by wt. % of the crosslinker composition):

| | |
|---|---|
| Titanium | 1–10 (preferably 1–5) |
| Acetic Acid | 0–64 |
| Hydroxyacetic Acid | 2–37 |
| Water | 0–32 |
| Total Solvent (including above water) | 5–40 |

It may be possible to operate outside of the above ranges in both the gel solutions, and the crosslinker compositions. However, the consequences of operating outside of the above ranges for the gel solutions are generally as follows: First, lower concentrations of polymer do not sufficiently increase the viscosity of the resulting gel mixture upon crosslinking. Higher concentrations of polymer will result in more viscous gels upon crosslinking, which may be difficult to handle in most field equipment. Lower concentrations of triethanolamine titanate on the other hand, reduce gel strength, while higher concentrations may cause syneresis. Lower concentrations of acetic acid may reduce delay times as the pH increases, whereas higher concentrations may produce unduly long delay times and reduce the stability of the crosslinked gel at elevated temperatures. Higher concentrations of hydroxyacetic acid on the other hand, may produce excessive delay times and reduce the viscosity of the crosslinked gel. As noted above though, the acetic acid concentration can be 0. For example, a 1/6/30 mole ratio of thiethanolamine titanate, hydroxyacetic acid and water, respectively, was used as a crosslinker composition which was added to an aqueous HPG solution (0.48% HPG wt. % based on total weight of solution), following the method of the trials of Table I (the titanium concentration from the complex, in resulting gel solution being 0.006 wt. % of that solution). The vortex closure time at room temperature was measured at greater than 20 minutes.

With regard to variations in concentrations of components in the crosslinker compositions, outside the above ranges, such variations are again possible and in many cases if the relative concentrations of components in the composition remain within the ranges suggested above, then the desired concentrations of components from the crosslinker compositions in the gel solution, can be obtained simply by varying the addition rates of the crosslinker compositions to the polymer solution. However, it should be noted that if the concentration of any particular constituent of the crosslinker composition, becomes relatively low, such may have to be compensated for by considerably increasing the volume of polymer solution. This may result in rates of addition of crosslinker composition to polymer solution which are too high to be conveniently accommodated by typical equipment. Alternatively, in situations where only relatively small volumes of crosslinker composition are required for a given volume of polymer solution, the crosslinker composition can be conveniently diluted with a suitable solvent such as water or methanol, to facilitate accurate monitoring of the addition rate with conventional equipment.

It will be appreciated that other substances may be present in the crosslinker composition or polymer solution, provided such do not interfere with the methods described above. For example, proppants (e.g., sand, bauxite, glass beads, etc.), corrosion inhibitors and viscosity stabilizers (e.g., $(NH_4)_2S_2O_3$ or methanol) can be, and typically are added to the formulated fracturing fluids. Further, it is possible to use other alpha-hydroxyacetic acids. Such other acids include lactic, mandelic, glyceric, malic, tartaric, citric acids, and the like. Various other modifications and alternations to the compositions and methods of the present invention, which are still within the scope of the present invention, will be evident to those skilled in the art. The scope of the present invention therefore, is to be determined from the following claims.

I claim:
1. A method of fracturing a subterranean formation penetrated by a well, comprising:
   (a) producing a gel solution by adding to an aqueous solution of an organic crosslinkable polymer:
      (i) a sufficient amount of a crosslinker composition to result in delayed crosslinking of the polymer, the crosslinker composition having an organic titanium complex to crosslink the polymer, an organic alpha-hydroxymonocarboxylic acid to delay crosslinking of the polymer by the titanium complex, and having a pH of no greater than 4.8;
      (ii) sufficient acid to result in a pH of substantially 3 to 5 in the polymer solution.
   (b) pumping the fracturing fluid through the well against the formation at a sufficient pressure and flow rate to create and/or extend a fracture into the subterranean formation.
2. A method as described in claim 1 wherein the polymer is selected from the group consisting of guar, hydroxypropyl guar, carboxymethyl hydroxypropyl guar, and carboxymethyl hydroxyethyl cellulose, the organic titanium complex is selected from the group consisting of triethanolamine titanate, titanium ammonium lactate, and titanium acetylacetonate, the alpha-hydroxymonocarboxylic acid is hydroxyacetic acid, and wherein the crosslinker composition contains a sufficient amount of acetic acid to produce pH of between about 4.5 and about 3 in the resulting mixture, when the pH of the polymer solution is substantially 7.
3. A method of fracturing a subterranean formation penetrated by a well, comprising:
   (a) producing a fracturing gel be adding to an aqueous solution of substantially 0.24% to 0.96% by weight of an organic crosslinkable polymer selected from the group consisting of guar, hydroxypropyl guar, carboxymethyl hydroxypropyl guar, carboxymethylhydroxyethyl cellulose, and
      (i) a sufficient amount of a crosslinker composition to result in delayed crosslinking of the polymer and produce a pH in the mixture of substantially less than 5, the crosslinker composition containing by weight, substantially 1% to 5% titanium from an organic titanium complex selected from the group consisting of triethanolamine titanate, titanium ammonium lactate, and titanium acetyl acetonate; substantially 1% to 37% hydroxyacetic acid; substantially 0% to 29% acetic acid; and substantially 7% to 53% solvent.
      (ii) sufficient acid to result in a pH of substantially 3 to 5 in the polymer solution;
   (b) pumping the fracturing fluid down the well under sufficient pressure to fracture the subterranean formation.

* * * * *